May 17, 1960  R. D. MILLER  2,936,644
GEAR HEAD
Filed Sept. 25, 1959  3 Sheets-Sheet 1
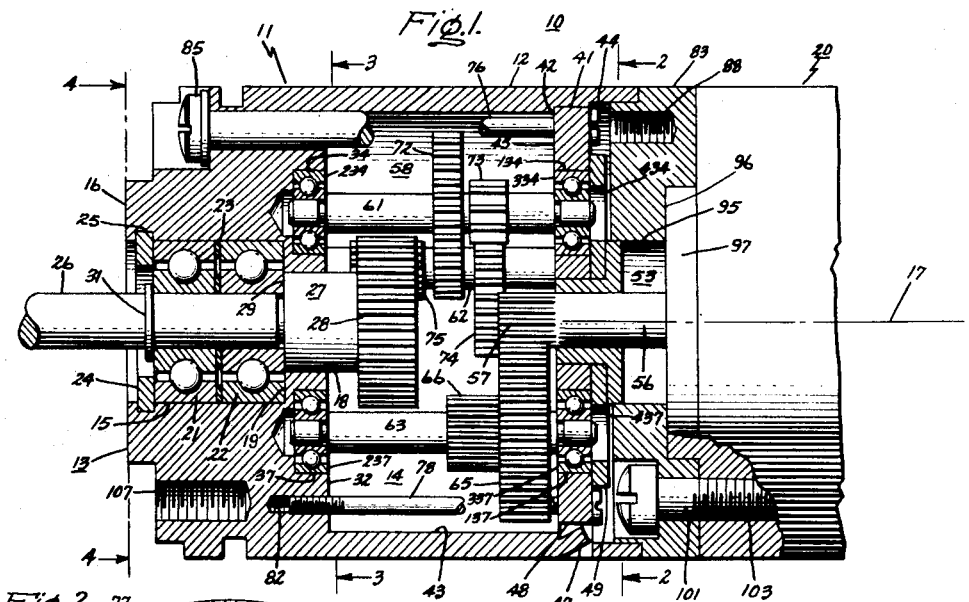
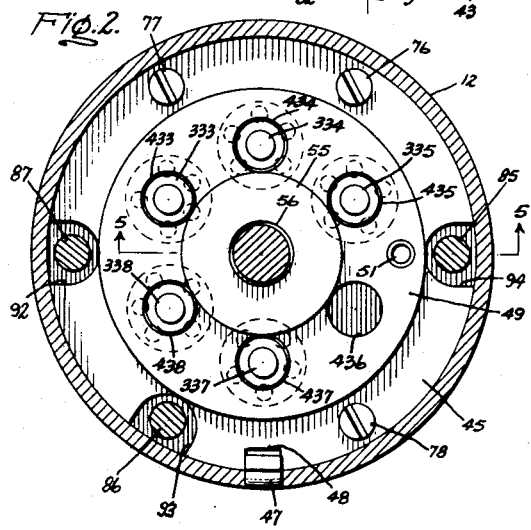
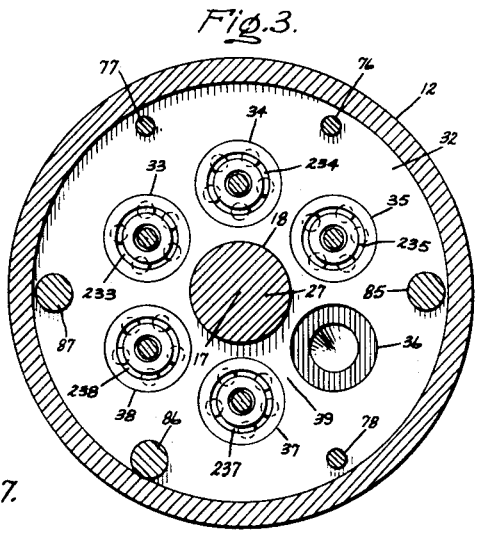
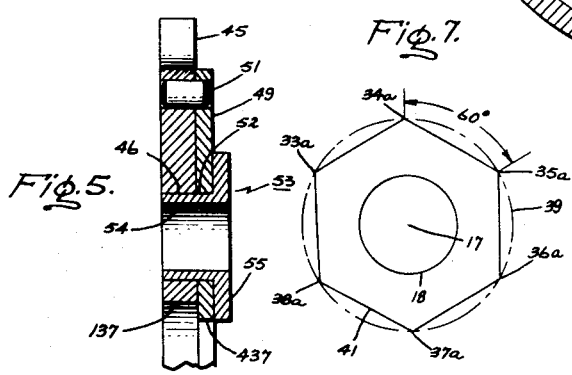
Inventor:
Richard D. Miller,
by Lust & Drish
Attorneys.

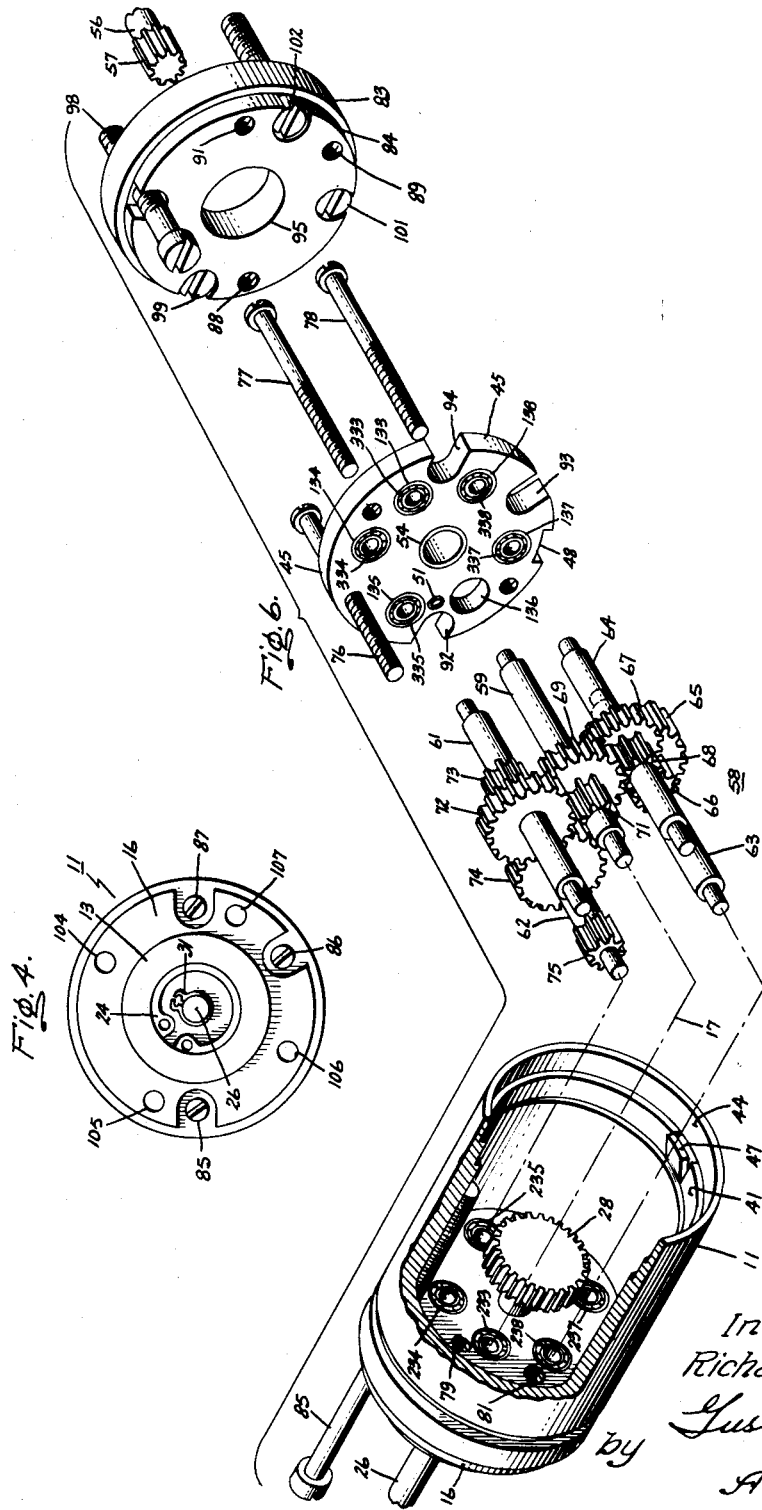

May 17, 1960  R. D. MILLER  2,936,644
GEAR HEAD
Filed Sept. 25, 1959  3 Sheets-Sheet 3

Inventor:
Richard D. Miller,
by Gust + Irish
Attorneys.

United States Patent Office 2,936,644
Patented May 17, 1960

2,936,644

GEAR HEAD

Richard D. Miller, Fort Wayne, Ind., assignor to Bowmar Instrument Corporation, Fort Wayne, Ind.

Application September 25, 1959, Serial No. 842,345

7 Claims. (Cl. 74—421)

This invention relates generally to speed reducing mechanisms and more particularly to miniature precision speed reducing mechanisms adapted for use with miniature servo motors or the like, commonly referred to as "gear heads."

In computer and airborne instrumentation and control technologies, it is frequently necessary to provide a speed reduction between a driving motor and the device driven thereby; a common instance is the necessity for gearing-down the output shaft rotational speed of a servo motor. In these technologies, the present trend is increasingly toward miniaturization, and it is thus necessary that such speed reducing gear mechanisms or gear heads be extremely small in size, and it is further necessary that they be constructed with great precision in order especially to minimize backlash in the gear train. Such gear heads must further be capable in some instances of providing extremely high gear reductions, i.e., as high as 20,000 to 1.

In the past, miniature gear heads known to the present applicant have conventionally employed a so-called "post and plate" type of construction. In these prior constructions, the gear clusters forming the gear train, i.e., a plurality of shafts each having a pinion and gear thereon, were supported between two plates held in assembled relation by elongated through-bolts with a dust cover and motor adapter completing the assembly. In such prior constructions, complete reliance for axial alignment of the bearings in the two plates supporting the gear cluster shafts was placed on the through-bolts, with the result that there was a common tendency to misalignment, great difficulties in assembly of the devices, and further the devices were prone to be accidentally knocked out of alignment during shipment or storage.

It is therefore highly desirable to provide a miniature precision speed reducing gear mechanism of the type here under consideration incorporating a construction which is not subject to the misalignment problems encountered in prior constructions and further which is more readily manufactured and assembled with the requisite precision. It is additionally desirable to provide a standardized construction in which a wide variety of gear ratios may be provided by the mere addition or deletion of gear clusters.

It is accordingly an object of my invention to provide an improved miniature precision speed reducing gear mechanism.

Another object of my invention is to provide an improved miniature gear head construction for use with servo motors or the like which is not subject to the misalignment problems encountered in prior mechanisms known to the present applicant.

A further object of my invention is to provide an improved miniature gear head characterized by its ease of manufacture and assembly with retention of the requisite precision.

Yet another object of my invention is to provide an improved miniature gear head construction in which accurate alignment of the gear clusters is provided without reliance on through-bolts or mounting posts.

My invention in its broader aspects provides a miniature precision speed reducing gear mechanism comprising a housing having a tubular portion with one end joined to an end portion and defining a cavity therewith. The housing end portion has a center opening extending therethrough coaxial with the axial center line of the housing and a first bearing is positioned in that opening. An output shaft is journaled in the first bearing and has a portion extending into the cavity with an output gear formed thereon. In accordance with a particularly important feature of my invention, the housing end portion has a plurality of bearing-receiving openings formed therein with their centers located on a circle concentric with the housing end portion center opening and respectively spaced apart by a distance equal to the radius of the circle, these bearing-receiving openings accommodating the gear cluster shafts. The bearing-receiving openings thus have equal spacing from each other and from the axis of the output shaft and thus the distance from each gear cluster shaft to its neighbor and to the axial center line is equal. A bearing plate is positioned in the other end of the housing tubular portion closing the cavity, the bearing plate also having a center opening extending therethrough coaxial with the axial center line of the device for receiving an input shaft. The bearing plate has the same number of bearing-receiving openings formed therein as the end portion with their centers also located on a circle concentric with the bearing plate center opening and having the same diameter as the previously referred to circle, the end plate bearing opening centers again being respectively spaced apart a distance equal to the radius of the circle. Anywhere from one to all of the pairs of axially aligned bearing-receiving openings in the bearings plate and in the housing end portion have bearings respectively positioned therein with speed reducing shafts having their ends respectively rotatably journaled in these bearing pairs and extending therebetween, each such speed-reducing or gear cluster shaft having a gear and pinion thereon with one pinion meshing with the output gear for driving the same and one such gear being arranged to be driven by a pinion formed on the input shaft. In accordance with a further feature of my invention, the bearing plate which accommodates the gear cluster bearings at the other end of the housing has a notch formed in its outer periphery, this notch cooperating with a projection formed on the inner surface of the housing tubular portion, thus providing axial alignment of the gear cluster bearings in the housing end portion and in the bearing plate; screw-bolts are now used only to hold the device in assembled relation and are not relied on for alignment of the gear clusters.

Further objects and advantages of this invention will become apparent by reference to the following description and the accompanying drawings, and the features of novelty which characterize this invention will be pointed out with particularity in the claims annexed to and forming a part of this specification.

In the drawings:

Fig. 1 is a cross-sectional view, partly broken away, showing a specific embodiment of my invention;

Fig. 2 is a cross-sectional view of the device of Fig. 1 taken along the line 2—2;

Fig. 3 is a cross-sectional view of the device of Fig. 1 taken along the line 3—3;

Fig. 4 is an end view of the mechanism of Fig. 1 as viewed along the line 4—4 thereof;

Fig. 5 is a fragmentary cross-sectional view taken along the line 5—5 of Fig. 2;

Fig. 6 is an exploded view in perspective, partly broken away, further illustrating the improved miniature gear head of my invention;

Fig. 7 is a schematic view useful in explaining the significance of the location of the gear cluster bearings in accordance with my invention;

Figure 8:
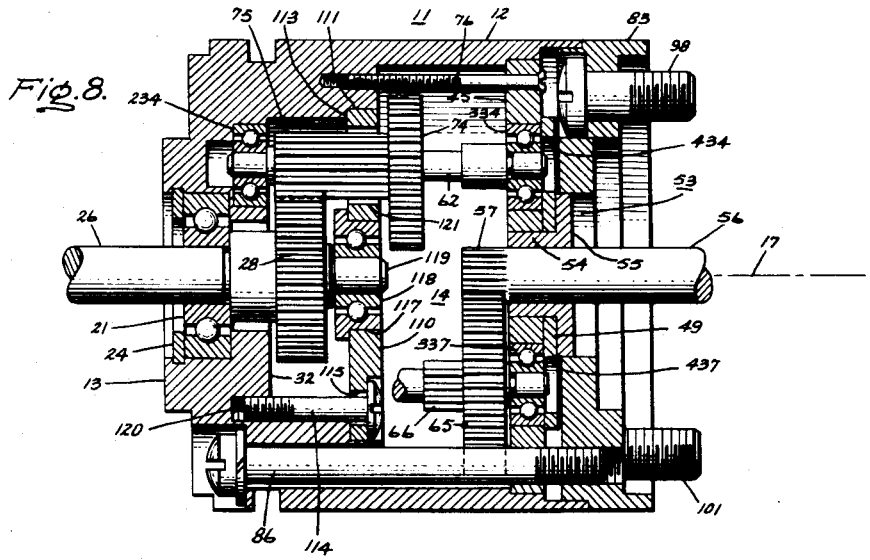
Fig. 8 is a cross-sectional view, partly broken away, illustrating a slightly modified form of my invention.

Referring now to Fig. 1, my improved miniature precision gear head, generally identified at 10, is shown connected to and driven by a conventional miniature servo motor, partially shown at 20. Gear head 10 includes a housing member 11 having a cylindrical portion 12 which, in the illustrated embodiment, is integrally joined to an end portion 13 thereby defining cavity 14; housing 11 is preferably formed from suitable metal, such as aluminum.

End portion 13 of housing 11 has a first opening 15 extending inwardly from its outer face 16 coaxial with axial center line 17, and a second opening 18 also coaxial with axial center line 17 extending between cavity 14 and opening 15; it will be seen that opening 18 has a smaller inside diameter than opening 15, thus defining an annular shoulder 19. In the illustrated embodiment, a pair of suitable ball bearings 21 and 22 are seated in opening 15 and housing end portion 13, being separated by suitable shims 23 with bearing 22 abutting against shoulder 19 as shown, and with the two bearings 21 and 22 being retained in opening 15 by means of a suitable split ring 24 engaging bearing 21 and seated in groove 25 formed in housing end portion 13. It will thus be seen that bearings 21 and 22 are inserted in opening 15 and loaded from end 16 of end portion 13.

Output shaft 26 is journaled in bearings 21 and 22, output shaft 26 having a shouldered portion 27 extending into cavity 14 with output gear 28 preferably integrally formed thereon. It will be seen that extension portion 27 of output shaft 26 has a shoulder 29 which abuts bearing 22 and thus it cooperates with split ring 31 in a suitable groove in output shaft 26 and engaging bearing 21 to limit end play of output shaft 26.

Referring now additionally to Fig. 3, the inner face 32 of housing end portion 13 has six bearing-receiving openings or pockets 33 through 38 respectively having their centers 33(a) through 38(a) equally spaced around circle 39 concentric with opening 18 in housing end portion 13 and coaxial with axial center line 17, i.e., centers 33(a) through 38(a) are spaced apart by distances equal to the radius of circle 39. Referring now additionally to Fig. 7, it will be readily seen that the centers 33(a) through 38(a) of the bearing-receiving pockets 33 through 38 have equal spacing from each other and from the axial center line 17 and thus that the centers 33(a) through 38(a) define a hexagon; thus, in accordance with my invention, openings 15 and 18 in end portion 13 of housing 11 are first bored, and then, locating from openings 15 and 18 the six gear cluster bearing-receiving openings 33 through 38 are then bored by indexing 60° (as shown in Fig. 7), to bore each pocket.

Cylindrical portion 12 of housing 11 has an annular stepped portion 41 formed in its inner surface adjacent its end remote from end portion 13 and defining an annular shoulder 42 with inner surface 43 which bounds cavity 14; the inside diameter of stepped portion 41 is greater than the inside diameter of cavity 14. The inside surface of cylindrical portion 12 is further provided with another increased diameter stepped portion 44 extending from stepped portion 41 to the end of cylindrical portion 12. A bearing plate 45 is seated in stepped portion 41 abutting shoulder 42 and closing cavity 14. Bearing plate 45 has a center opening 46 formed therethrough coaxial with axial center line 17 for accommodating the input shaft, as will hereinafter be more full described. Bearing plate 45 is further provided with six bearing-receiving openings 133 through 138 having their centers evenly spaced about a circle coaxial with center opening 46 and having the same diameter as circle 39 upon which the centers of bearing pockets 33 through 38 of end portion 16 are located. Bearing-receiving openings 133 through 138 of end plate 45 thus in common with bearing-receiving pockets 33 through 38 of end portion 13 have equal spacing from each other and from the axis 17 of the input and output shafts. Bearing-receiving openings 133 through 138 in bearing plate 45 can thus be formed in the same manner as bearing-receiving pockets 33 through 38 in end portion 13, i.e., by first boring center opening 46 and then locating from center opening 46 and boring the bearing-receiving openings 133 through 138 with 60° indexing. It will now be seen that when bearing plate 45 is properly aligned with respect to end portion 13, bearing-receiving openings 133 through 138 will respectively be in axial alignment with bearing receiving pockets 33 through 38.

In order to provide such axial alignment, a tang 47 is struck inwardly from the wall of cylindrical portion 12 so that it projects into stepped portion 41 and a notch or slot 48 is formed in the outer periphery of bearing plate 45; notch 48 cooperatively engages tank 47 when bearing plate 45 is seated in stepped portion 41 against shoulder 42 thereby accurately to align bearing-receiving openings 133 through 138 in bearing plate 45 with bearing-receiving pockets 33 through 38 in end portion 13.

It will now be seen that in my improved gear mechanism construction, anywhere from one to six intermediate speed reducing gear clusters can be provided by virtue of the availability of the six bearing-receiving openings in bearing plate 45 and the corresponding six bearing-receiving pockets in end portion 13. In the illustrated embodiment, a total of five gear clusters are employed, and thus, five ball bearings 233, 234, 235, 237 and 238 are respectively seated in bearing-receiving pockets 33, 34, 35, 37 and 38 of end portion 13 and a corresponding five ball bearings 333, 334, 335, 337 and 338 are seated in bearing-receiving openings 133, 134, 135, 137 and 138 in bearing plate 45; it will be seen that the corresponding bearing-receiving pocket 36 in end portion 13 on bearing-receiving opening 136 in bearing plate 45 are left blank, i.e., with no bearings being respectively seated therein.

In order to retain the bearings in their respective bearing-receiving openings 133 through 138 in bearing plate 45, a back-up plate 49 is provided coaxially secured to the side of bearing plate 45 of cavity 14 by a pin 51. Back-up plate 49 has a center opening 52 coaxial with center opening 46 of bearing plate 45 and has six openings 433 through 438 formed therethrough respectively coaxial with bearing-receiving openings 133 through 138 in bearing plate 45 but respectively having a smaller diameter, as shown. It will now be readily seen, particularly with reference to Fig. 1, that bearings 333, 334, 335, 337 and 338 seated in the corresponding bearing-receiving openings of bearing plate 45 respectively engage back-up plate 49. An input shaft bushing 53 is provided having a cylindrical portion 54 seated in and extending through center openings 46 and 52 in bearing plate 45 and back-up plate 49 and having an annular flange portion 55 engaging the outer surface of back-up plate 49, as shown. As will be hereinafter more fully described, input shaft 56 from motor 20 extends through bushing 53 and has a driving pinion 57 formed thereon.

In order to couple input shaft 56 and input pinion 57 to output shaft 26 in output gear 28 in speed reducing driving relationship, gear train 58 is provided which, in the illustrated embodiment, is formed of five gear clusters, each comprising a shaft having its ends rotatably journaled in respectively corresponding bearings in end portion 13 of housing 11 and bearing plate 45, and extending axially therebetween, and having a pinion and gear respectively formed thereon. Thus, shaft 59 is journaled in and extends between bearings 233 and 333, shaft 61 is journaled in bearings 234 and 334, shaft 62 is journaled in bearings 235 and 335, shaft 63 is journaled in bearings 237 and 337, and shaft 64 is journaled in bearings 238 and 338. In the illustrated embodiment which provides a speed reduction of 1258.73 to 1. input pinion, 57 is provided with thirteen teeth and meshes with gear 65 on shaft 63 having forty-seven teeth. Pinion 66 on shaft 63 having twenty-five teeth, meshes with gear 67 on shaft 64 having thirty-four teeth, while pinion 68 on shaft 64, having eight teeth, meshes with gear 69 on shaft 59, having thirty-two teeth. Pinion 71 on shaft 59, having eight teeth, meshes with gear 72 on shaft 61 having thirty-two teeth, with pinion 73 on shaft 61 having eight teeth meshes with gear 74 on shaft 62 having thirty-two teeth. Finally, pinion 75 on shaft 62 having eight teeth meshes with output gear 28 on output shaft 26 having thirty-two teeth.

It will now be readily apparent that my construction lends itself to the provision of a wide range of speed reduction gear ratios merely by adding or subtracting gear clusters and/or modifying the respective pinion-gear tooth ratios. This can be readily accomplished by virtue of the fact that the cord distance from each gear cluster shaft to the adjacent gear cluster shaft on either side, together with the radial distance to the axial center line 17, is identical.

Bearing plate 45 is held in its assembled position in stepped diameter portion 41 abutting shoulder 42 by means of through-bolts 76, 77 and 78 which extend through openings in bearing plate 45 with their heads engaging the outer surface thereof and their ends threadingly engaging tapped openings 79, 81 and 82 in face 32 of end portion 13. It will now be readily seen that bearing plate 45 is supported, positioned and aligned solely by virtue of its being seated in stepped diameter portion 41 of cylindrical portion 12 of housing 11 in engagement with shoulder 42 and by the cooperative engagement of notch 48 in tang 47, through-bolts 76, 77 and 78 merely serving to hold bearing plate 45 and the gear clusters 58 in assembled relation. Thus, reliance is not placed on the through-bolts 76, 77 and 78 for support and alignment of the gear train and thus, one of the aforementioned difficulties encountered in prior constructions is eliminated in my new construction.

In order to mount gear head 10 on motor 11 to be driven thereby, a motor adapter plate 83 is provided, preferably having its outside diameter coincident with the outside diameter of cylindrical portion 12 of gear head housing 11, and having a decreased diameter stepped portion 84 seated within stepped diameter portion 44 of tubular portion 12, as shown. Motor adapter plate 83 is secured to gear head 10 by means of through-bolts 85, 86 and 87 respectively extending through openings formed through end portions 13 with their heads seated in recesses formed in the exterior face 16 of end portion 13 and their ends threadingly engaging tapped openings 88, 89 and 91 formed in the inner surface of adapter plate 83; it will be observed that through-bolts 85, 86 and 87 are respectively accommodated by notches or slots 92, 93 and 94 formed in the outer periphery of bearing plate 45. Motor adapter plate 83 has a central opening 95 which accommodates annular flange 55 of bushing 53 and communicates with an annular recess 96 which in turn accommodates bearing hub 97 of motor 20. Motor 20 is in turn held in engagement with motor adapter plate 83 by means of four bolts 98, 99, 101 and 102, which extend through openings in motor adapter plate 83 with their heads seated in recesses on the inner surface thereof and their ends threadingly engaging suitable tapped openings 103 formed in motor 20.

Gear head 10 is in turn adapted to be connected to the device being driven thereby by means of four tapped openings 104, 105, 106 and 107 respectively formed on the exterior face 16 of end portion 13. It will be observed that the tapped openings 104, 105, 106 and 107 in the exterior surface of end portion 16 are respectively in radial alignment with bolts 98, 99, 101 and 102 in motor adapter plate 83, and thus it will be readily comprehended that another gear head may be attached to end portion 16 and secured thereto by bolts 98, 99, 101 and 102, threadingly engaging openings 104 through 107, with a pinion being formed on output shaft 26 and thus serving as the input for the additional gear head, the two gear heads thus being connected in cascade.

A specific embodiment of my invention in accordance with the foregoing having a speed reduction 1258.73 to 1 has a diameter of approximately one inch and an overall length of approximately one and one-quarter inches.

Referring now to Fig. 8 in which like elements are indicated by like reference numerals in certain larger sizes of gear heads, it may not be found desirable to support the output gear 28 of the embodiment of the previous figures in cantilevered fashion as therein shown, but rather to provide an outward bearing for supporting the output gear. Thus, in the embodiment of Fig. 8, another stepped diameter portion 111 in formed in the inner surface of cavity 14 spaced outwardly from inner surface 32 of end portion 16 and another bearing plate 110 is seated in this stepped diameter portion 111 against shoulder 113; bearing plate 110 is held in assembled relation against shoulder 113 by means of through-bolts 114 extending through openings 115 in bearing plate 110 with their heads seated in recesses in the outer surface of bearing plate 110, i.e., facing cavity 14, and with their ends threadingly engaging suitable tapped openings 120 in inner surface 32 of end portion 13. Bearing plate 110 has a central opening 117 coaxial with axial center line 17 in which a ball bearing 118 is seated rotatably supporting outboard end 119 of output shaft 26. With the outboard end of output shaft 26 being supported by a bearing, one of the two bearings 21, 22 of Fig. 1 may be eliminated and thus a single bearing 21 is provided supporting output shaft 26 on the other side of output gear 28. Bearing plate 110 also has six openings 121 formed therethrough respectively in alignment with bearing receiving pockets 33 through 38 in end portion 13 and bearing receiving openings 133 through 138 in bearing plate 45 for respectively accommodating gear cluster shafts 59 through 64. As seen in Fig. 8, openings 128 are respectively larger in diameter than pinion 75 in order to permit assembly and disassembly of the gear clusters subsequent to positioning of bearing plate 110 in stepped diameter portion 111.

Figure 9:
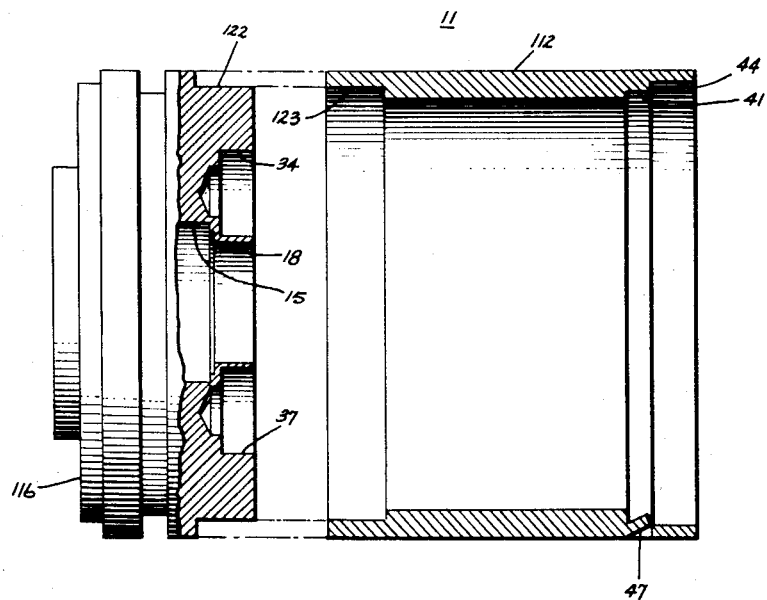
Fig. 9 is another cross-sectional view, partly broken away, illustrating another slightly modified form of my invention.

Referring now to Fig. 9, while the housing 11 of Fig. 1 is shown as being integrally formed, i.e., with cylindrical portion 12 and end portion 13 being machined from a single unitary section of metal, such as aluminum bar stock, it will be readily apparent that the tubular portion of the housing and the end portion may be separately formed. Thus, in Fig. 8 in which like elements are again indicated by like reference numerals, tubular portion 112 is separately formed, such as from a section of seamless aluminum tubing, and end portion 116 is likewise separately formed. Here, end portion 116 has a stepped diameter portion 122 formed in its outer periphery and cylindrical portion 112 likewise has a stepped portion 123 which is press-fitted onto stepped diameter portion 122 of end portion 116 in order to complete the assembly.

It will now be readily seen that my improved gear head construction eliminates the through-bolt or post mounting of one bearing plate employed in prior miniature gear head constructions thus making the construction more vibration and shock resistant and eliminating the misalignment problems encountered in such prior constructions. My improved construction is further more readily assembled and disassembled, more flexible in that it can accommodate a wide range of gear reductions, and less expensive to manufacture than prior constructions known to the present applicant.

While I have illustrated and described specific embodiments of my invention, further modifications and improvements will occur to those skilled in the art, and I desire therefore in the appended claims to cover all modifications which do not depart from the spirit and scope of this invention.

What is claimed is:

1. A miniature precision speed reducing gear mechanism adapted to be connected to a miniature servo motor or the like and to be driven thereby, said mechanism comprising: a housing having a cylindrical portion with one end joined to an end portion and defining a cylindrical cavity therewith, said housing end portion having a first cylindrical opening extending therein from its outer side remote from said cylindrical portion and a second cylindrical opening having a smaller diameter than said first opening extending between said cavity and said first opening and defining an annular shoulder at the inner end of said first opening, said first and second openings being coaxial with the axial center line of said housing; a first bearing positioned in said first opening with its inner side abutting said shoulder; means engaging said housing end portion and the outer end of said first bearing for retaining the same in said first opening; an output shaft journaled in said first bearing and having a portion extending into said cavity with a shoulder formed thereon abutting said inner side of said first bearing; an output gear on said output shaft extension portion, the inner side of said housing end portion facing said cavity having six bearing-receiving pockets formed therein with their centers evenly spaced about a first circle concentric with said housing end portion openings; said cavity having an inner portion and an increased inside diameter outer portion at the other end of said housing cylindrical portion joined to said inner portion by another annular shoulder; an annular bearing plate seated in said outer cavity portion and abutting said other shoulder thereby closing said cavity inner portion, said bearing plate having a center opening extending therethrough coaxial with said axial center line for receiving an input shaft, said bearing plate having six bearing-receiving openings extending therethrough with their centers evenly spaced about a second circle concentric with said bearing plate opening and having the same diameter as said first circle, said bearing plate having a notch formed in its outer periphery; said housing cylindrical portion having a tank struck inwardly therefrom adjacent said other shoulder and cooperatively engaging said bearing plate notch for positioning said bearing plate so that its bearing-receiving openings are respectively in axial alignment with said housing end portion bearing pockets; at least one pair of axially aligned bearing-receiving pockets and openings having bearings respectively seated therein; at least one gear cluster including a speed-reduction shaft having its ends respectively rotatably journaled in said bearings and extending therebetween, and a gear and pinion secured to said speed reduction shaft with said pinion cooperatively meshing with said output gear for driving the same and said gear being arranged to be driven by said input shaft; said housing cylindrical portion being proportioned so that said cavity will accommodate six gear clusters with their shafts respectively journalled in bearings in all of said housing end portion pockets and said bearing plate bearing-receiving openings with their gears and pinions cooperating to provide a speed reduction between said input shaft and said output gear an annular back-up plate secured to the outer face of said bearing plate and having six openings extending therethrough respectively coaxial with said bearing plate bearing-receiving openings but having a smaller diameter for retaining the bearings in said bearing plate bearing-receiving openings, said back-up plate having a center opening extending therethrough coaxial with said bearing plate center opening; an input shaft bushing seated in said bearing plate and back-up plate center openings and having an annular flange abutting the other face of said back-up plate; said bearing plate having a plurality of openings formed therethrough radially outward from said back-up plate; and a plurality of through-bolts extending through said last-named openings in said bearing plate with head portions engaging said outer face of said bearing plate and having their ends threadingly engaging said inner side of said housing end portion thereby retaining said bearing plate speed reducing shaft and gears and pinion in operative position.

2. The combination of claim 1 further comprising: an annular motor adapter plate abutting the other end of said housing cylindrical portion and having a stepped-diameter outer periphery with the smaller diameter step fitting in said housing outer cavity portion and closing the same and with the larger diameter step being coextensive with the outside diameter of said housing cylindrical portion, said adapter plate having a center opening extending therethrough coaxial with said axial center line for receiving said input shaft; a second plurality of through-bolts extending through openings in said housing end portion and in said bearing plate radially outwardly from said back-up plate and having their head portions engaging said housing end portion outer side and their ends threadingly engaging said adapter plate for retaining the same in assembled relation; said motor adapter plate having a plurality of other openings extending therethrough radially outward from said center opening; and a third plurality of through-bolts extending through said other openings in said adaptor plate with their heads engaging the inner surface thereof and their ends extending outwardly from the outer surface thereof for attaching said adapter plate to said driving motor thereby to support said mechanism therefrom.

3. A miniature precision speed reducing gear mechanism adapted to be connected to a miniature servo motor or the like and to be driven thereby, said mechanism comprising: a housing having a tubular portion with one end joined to an end portion and defining a cavity therewith, said housing end portion having a center opening extending therethrough coaxial with the axial center line of said housing; a first bearing positioned in said center opening; an output shaft journaled in said first bearing and having a portion extending into said cavity; an output gear on said output shaft extension portion; said housing end portion having a plurality of bearing-receiving openings formed therein with their centers located on a first circle concentric with said housing end portion center opening and respectively spaced apart by distances equal to the radius of said first circle; an annular bearing plate positioned in the other end of said housing tubular portion and closing said cavity, said bearing plate having a center opening extending therethrough coaxial with said axial center line for receiving an input shaft, said bearing plate having a plurality of bearing-receiving openings formed therein with their centers located on a second circle concentric with said bearing plate center opening and having the same diameter as said first circle, said last-named centers being respectively spaced apart by distances equal to the radius of said second circle; cooperating means on said housing tubular portion and said bearing plate for positioning the same so that its bearing-receiving openings are respectively in axial aligiment with said housing end portion bearing-receiving openings; at least one pair of axially aligned bearing-receiving openings in said bearing plate and housing end portion having bearings respectively positioned therein; at least one gear cluster including a speed reducing shaft having its ends respectively rotatably journaled in said last-named bearings and extending therebetween, and a gear and pinion secured to said last-named shaft with said pinion cooperatively meshing with said output gear for driving the same and said gear being arranged to be driven by said input shaft; said housing tubular portion being proportioned so that said cavity will accommodate a plurality of gear clusters with their shafts respectively journaled in bearings in all of said housing end portion and bearing plate bearing-receiving openings and with their gears and pinions cooperating to provide speed reduction between said input shaft and said output gear; an annular motor adaptor plate abutting the other end of said housing tubular portion and spaced outwardly from said bearing plate, said adaptor plate having a center opening extending therethrough coaxial with said axial center line for receiving said input shaft; a plurality of fastener means extending through said housing end portion and said bearing plate and secured to said adaptor plate for retaining the same in assembled position; and another plurality of fastener means extending through said adaptor plate for securing the same to said driving motor thereby to support said mechanism therefrom.

4. A miniature precision speed reducing gear mechanism adapted to be connected to a miniature servo motor or the like and to be driven thereby, said mechanism comprising: a housing having a tubular portion with one end joined to an end portion and defining a cavity therewith, said housing end portion having a center opening extending therethrough coaxial with the axial center line of said housing; a first bearing positioned in said center opening; an output shaft journaled in said first bearing and having a portion extending into said cavity; an output gear on said output shaft extension portion; said housing end portion having a plurality of bearing-receiving openings formed therein with their centers located on a first circle concentric with said housing end portion center opening and respectively spaced apart by distances equal to the radius of said first circle; an annular bearing plate positioned in the other end of said housing tubular portion and closing said cavity, said bearing plate having a center opening extending therethrough coaxial with said axial center line for receiving an input shaft, said bearing plate having a plurality of bearing-receiving openings formed therein with their centers located on a second circle concentric with said bearing plate center opening and having the same diameter as said first circle, said last-named centers being respectively spaced apart by distances equal to the radius of said second circle; cooperating means on said housing tubular portion and said bearing plate for positioning the same so that its bearing-receiving openings are respectively in axial alignment with said housing end portion bearing-receiving openings; at least one pair of axially aligned bearing-receiving openings in said bearing plate and housing end portion having bearings respectively positioned therein; at least one gear cluster including a speed reducing shaft having its ends respectively rotatably journaled in said last-named bearings and extending therebetween, and a gear and pinion secured to said last-named shaft with said pinion cooperatively meshing with said output gear for driving the same and said gear being arranged to be driven by said input shaft; said housing tubular portion being proportioned so that said cavity will accommodate a plurality of gear clusters with their shafts respectively journaled in bearings in all of said housing end portion and bearing plate bearing-receiving openings and with their gears and pinions cooperating to provide speed reduction between said input shaft and said output gear; an annular motor adaptor plate abutting the other end of said housing tubular portion and spaced outwardly from said bearing plate, said adaptor plate having a center opening extending therethrough coaxial with said axial center line for receiving said input shaft; a plurality of fastener means extending through said housing end portion and said bearing plate and secured to said adaptor plate for retaining the same in assembled position; and another plurality of fastener means extending through said adaptor plate for securing the same to said driving motor thereby to support said mechanism therefrom; another plate positioned in said cavity and extending thereacross, said other plate being spaced from said housing end portion and having a center opening extending therethrough coaxial with said axial center line; and another bearing positioned in said other plate center opening and rotatably supporting the end of said output shaft extension portion with said output gear being positioned between said other plate and said housing end portion; said other plate having a plurality of openings formed therethrough equal in number and respectively coaxial with said housing end portion bearing-receiving openings for receiving said speed reducing shaft, said last-named openings having a larger diameter than the diameter of said pinion.

5. The combination of claim 1 further comprising: an annular motor adaptor plate abutting the other end of said housing cylindrical portion and having its outer periphery coextensive with the outer periphery of said housing cylindrical portion, said adaptor plate having a center opening extending therethrough coaxial with said axial center line for receiving said input shaft, said adaptor plate center opening surrounding said bushing annular flange; said housing end portion having a plurality of openings formed therethrough radially outwardly from said bearing-receiving pockets; said bearing plate having a second plurality of openings formed therethrough radially outward from said back-up plate and respectively in alignment with said plurality of housing end portion openings; a second plurality of through-bolts extending respectively through said plurality of housing end portion openings and said second plurality of bearing plate openings with their head portions engaging said housing end portion outer side and their ends threadingly engaging tapped openings in said adaptor plate; the through-bolts of said first and second pluralities totalling six and all being evenly spaced about a third circle concentric with said first and second circles, said through-bolts of said first and second pluralities being located on radii of said third circle midway between the radii of said first and second circles on which said bearing receiving pockets and openings are located, said third circle having a diameter larger than the diameter of said first and second circles and such that the outer periphery of said gear of said one cluster has clearance with the adjacent two through-bolts; said adaptor plate having four evenly spaced openings formed therethrough located on a fourth circle concentric with said third circle, said four openings being intermediate said adaptor plate tapped openings; and four through-bolts extending respectively through said four adaptor plate openings with their heads engaging the inner surface thereof and their ends extending outwardly from the outer surface thereof for attaching said adaptor plate to said driving motor thereby to support said mechanism therefrom.

6. The combination of claim 5 wherein the diameter of said fourth circle is less than the diameter of said third circle, but greater than the diameters of said first and second circles.

7. The combination of claim 1 in which at least three pairs of axially aligned bearing receiving pockets and openings have pairs of bearings respectively seated therein, in which at least three gear clusters are provided with their shafts having their ends respectively journalled in said bearing pairs and extending therebetween, in which th gear on a first cluster is arranged to mesh with a pinion on said input shaft and the pinion on the last cluster meshes with said output gear, the remaining pinions and gears of said clusters meshing to form a speed reducing gear train between said input shaft and said output gear, said output gear and all other gears except the gear of said first cluster and the gear which meshes with the pinion of said first cluster having the same number of teeth, the pinion which meshes with said output gear and all other pinions except said pinion of said input shaft and said pinion of said first cluster having the same number of teeth.

References Cited in the file of this patent

UNITED STATES PATENTS

| | | |
|---|---|---|
| 963,837 | Canedy | Feb. 25, 1902 |
| 781,062 | Hauss et al. | Jan. 31, 1905 |
| 1,442,217 | Doubler | Jan. 16, 1923 |
| 1,475,153 | Athenas | Nov. 20, 1923 |
| 1,785,798 | Weiss | Dec. 23, 1930 |
| 2,065,753 | Schmitter et al. | Dec. 29, 1936 |
| 2,073,348 | Merkle | Mar. 9, 1937 |
| 2,528,836 | Le Tourneau | Nov. 7, 1950 |
| 2,794,350 | Hart | June 4, 1957 |
| 2,817,977 | Holt | Dec. 31, 1957 |
| 2,883,880 | Merkle | Apr. 28, 1959 |
| 2,892,357 | Bachman | June 30, 1959 |
| 2,908,180 | Swensen | Oct. 13, 1959 |

UNITED STATES PATENT OFFICE
CERTIFICATE OF CORRECTION

Patent No. 2,936,644　　　　　　　　　　　　　　May 17, 1960

Richard D. Miller

It is hereby certified that error appears in the printed specification of the above numbered patent requiring correction and that the said Letters Patent should read as corrected below.

Column 7, line 30, for "and" read -- end --; line 54, for "tank" read -- tang --; column 8, line 8, for "other" read -- outer --.

Signed and sealed this 18th day of October 1960.

(SEAL)
Attest:
KARL H. AXLINE
Attesting Officer

ROBERT C. WATSON
Commissioner of Patents